(12) United States Patent
Casagrande

(10) Patent No.: US 8,437,622 B2
(45) Date of Patent: May 7, 2013

(54) ALTERING PRESENTATION OF RECEIVED CONTENT BASED ON USE OF CLOSED CAPTIONING ELEMENTS AS REFERENCE LOCATIONS

(75) Inventor: Steven Michael Casagrande, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 73 days.

(21) Appl. No.: 13/215,916

(22) Filed: Aug. 23, 2011

(65) Prior Publication Data

US 2013/0051764 A1  Feb. 28, 2013

(51) Int. Cl.
H04N 5/76 (2006.01)
H04N 5/92 (2006.01)

(52) U.S. Cl.
USPC .............. 386/291; 386/292; 386/244

(58) Field of Classification Search .......... 386/244, 386/245, 248, 291, 292, 298
See application file for complete search history.

(56) References Cited

U.S. PATENT DOCUMENTS

2002/0075403 A1* 6/2002 Barone et al. ........... 348/461
2009/0129749 A1* 5/2009 Oyamatsu et al. ........... 386/95

OTHER PUBLICATIONS

Author Unknown, "Move Networks is Delivering the Next Generation of Television," Move Networks, 2010, obtained online at http://movenetworks.com/, 2 pages.

* cited by examiner

Primary Examiner — Robert Chevalier
(74) Attorney, Agent, or Firm — Kilpatrick Townsend & Stockton LLP

(57) ABSTRACT

A content receiver receives an captioning element and positional information regarding segments of a content instance. The captioning element corresponds to a component of captioning data included in content that can be utilized with the positional information to locate where the segments stop and/or start. The content receiver analyzes the content based on the captioning element and the positional information and alters how the content will be presented. Such alteration may involve skipping and/or deleting segments, starting/stopping presentation of content other than at the beginning and/or end of the content, altering recording timers, and/or replacing segments with alternative segments. In some implementations, the content may be recorded as part of recording multiple content instances received via at least one broadcast from a content provider wherein the multiple content instances are all included in a same frequency band of the broadcast and are all encoded utilizing a same control word.

20 Claims, 5 Drawing Sheets

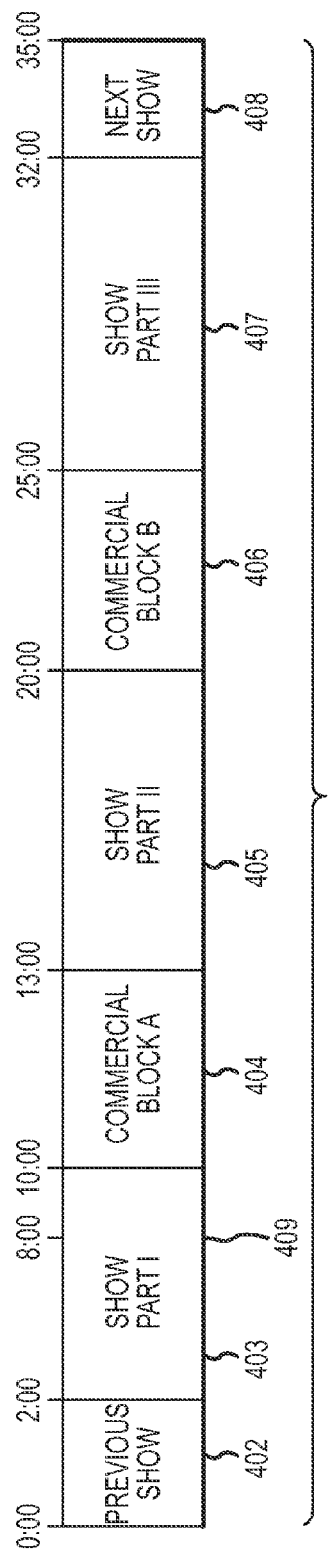
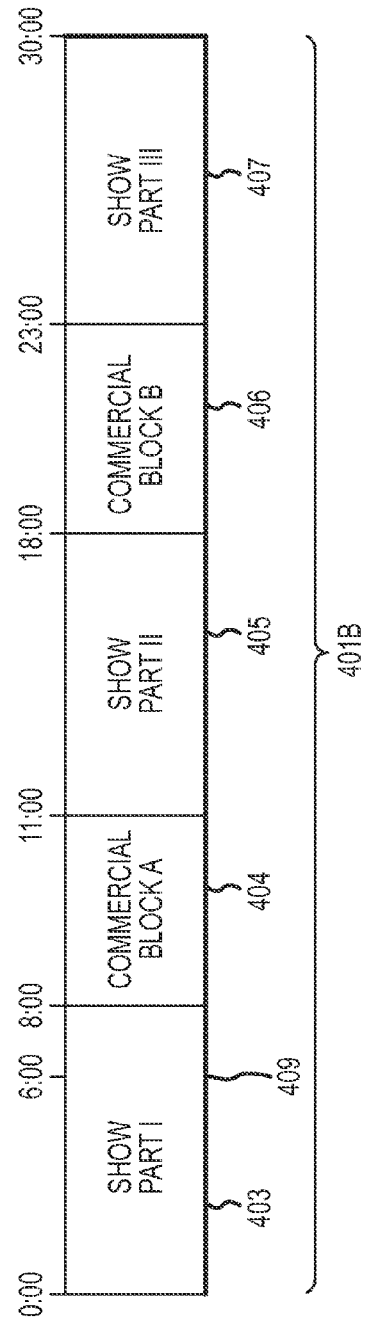
FIG.4A
FIG.4B

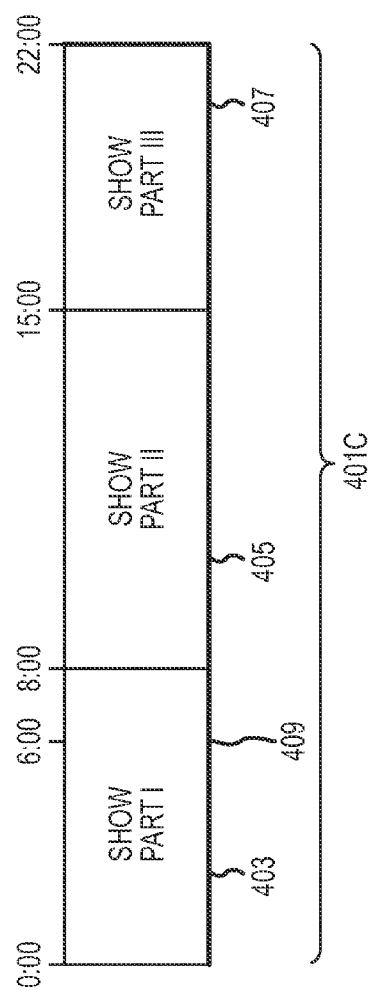
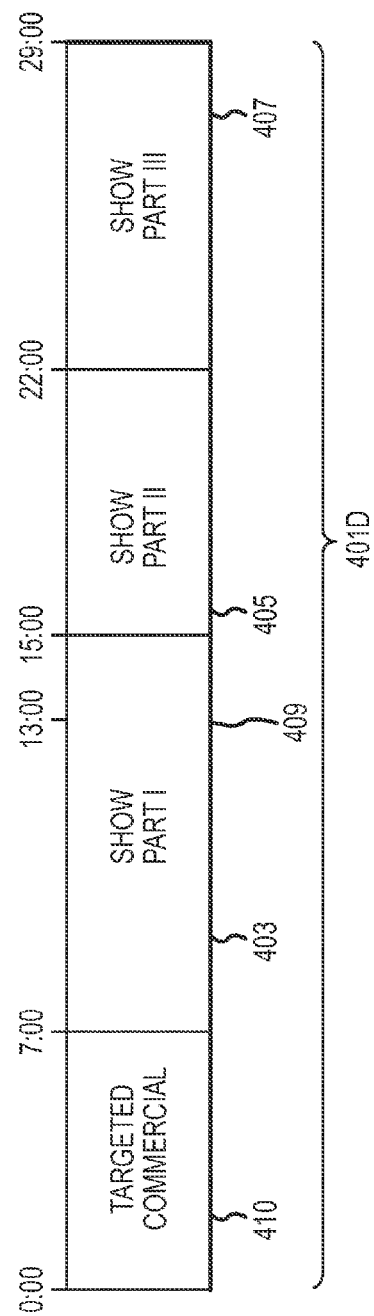

ALTERING PRESENTATION OF RECEIVED CONTENT BASED ON USE OF CLOSED CAPTIONING ELEMENTS AS REFERENCE LOCATIONS

FIELD OF THE INVENTION

This disclosure relates generally to presentation of received content, and more specifically to altering how received content will be presented based on received positional information regarding segments (or portions) of the content relative to closed captioning elements.

SUMMARY

The present disclosure discloses systems and methods for altering presentation of received content based on relative position of closed captioning elements. A content receiver may receive one or more closed captioning elements along with positional information regarding one or more segments of an instance of content. The closed captioning element may correspond to a component of the closed captioning data included in the content that can be utilized with the positional information to locate where the segments (or portions of the content) stop and/or start relative to the component of the closed captioning data. The content receiver may analyze the instance of content based at least on the closed captioning element and the positional information. Based on this analysis, the content receiver may alter how the instance of content will be presented.

In some cases, such alteration may involve skipping and/or deleting one or more segments (portions of the content), such as one or more commercials and/or one or more segments that are designated with a content rating above a content rating threshold set for the content receiver. In other cases, alteration may involve starting presentation of content at a location other than the beginning of the recorded content and/or stopping presentation of content at a location other than the end of the recorded content. In still other cases, alteration may include altering recording timers if the closed captioning element and position information are received before recordation completes. In yet other cases, alteration may involve replacing one or more commercials with alternative commercials, such as commercials specifically targeted to the user of the content receiver.

In various implementations, the instance of content may be recorded as part of recording a plurality of instances of content received via at least one broadcast from one or more content providers. In such implementations, the plurality of instances of content may all be included in a same frequency band of the broadcast and may all encoded utilizing a same control word. However, in other implementations the instance of content may be recorded as part of recording a single audio/visual stream.

In one or more cases, the component of the closed captioning data included in the instance of content corresponding to the closed captioning element may be unique within the total closed captioning data included the instance of content. As such, if the content receiver locates the unique component of the closed captioning data, the content receiver may then utilize the positional information to determine the locations of the segments. However, in some cases, the component of the closed captioning data included in the instance of content corresponding to the closed captioning element may not be unique as it may occur multiple times during the total closed captioning data included in the instance of content. In such cases, the positional information may be selected based on relative temporal position of the segments with respect to the first occurrence of the component of the closed captioning data included in the instance of content corresponding to the closed captioning element. As such, if the content receiver locates the first occurrence of the component of the closed captioning data included in the instance of content corresponding to the closed captioning element, the content receiver may then utilize the positional information to determine the locations of the segments.

In still other cases where the component of the closed captioning data included in the instance of content corresponding to the closed captioning element may not be unique as it occurs multiple times during the total closed captioning data included in the instance of content, the closed captioning element may correspond to the first component of the closed captioning data and an additional component of the closed captioning data that is located within temporal proximity to the first component in the closed captioning data. Although the first component of the closed captioning data included in the instance of content corresponding to the closed captioning element may occur multiple times, there may be only one occurrence of the first component of the closed captioning data that is temporally located proximate to the additional component in the closed captioning data included in the instance of content. As such, if the content receiver locates the occurrence of the first component of the closed captioning data that occurs within the temporal proximity of the additional component of the closed captioning data in the closed captioning data included in the instance of content, the content receiver may then utilize the positional information to determine the locations of the segments.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 4A-4D are diagrams illustrating alteration of presentation of received content by a system based on relative position of closed captioning elements. The system may be the system of FIG. 2.

DETAILED DESCRIPTION OF THE EMBODIMENTS

Figure 1:
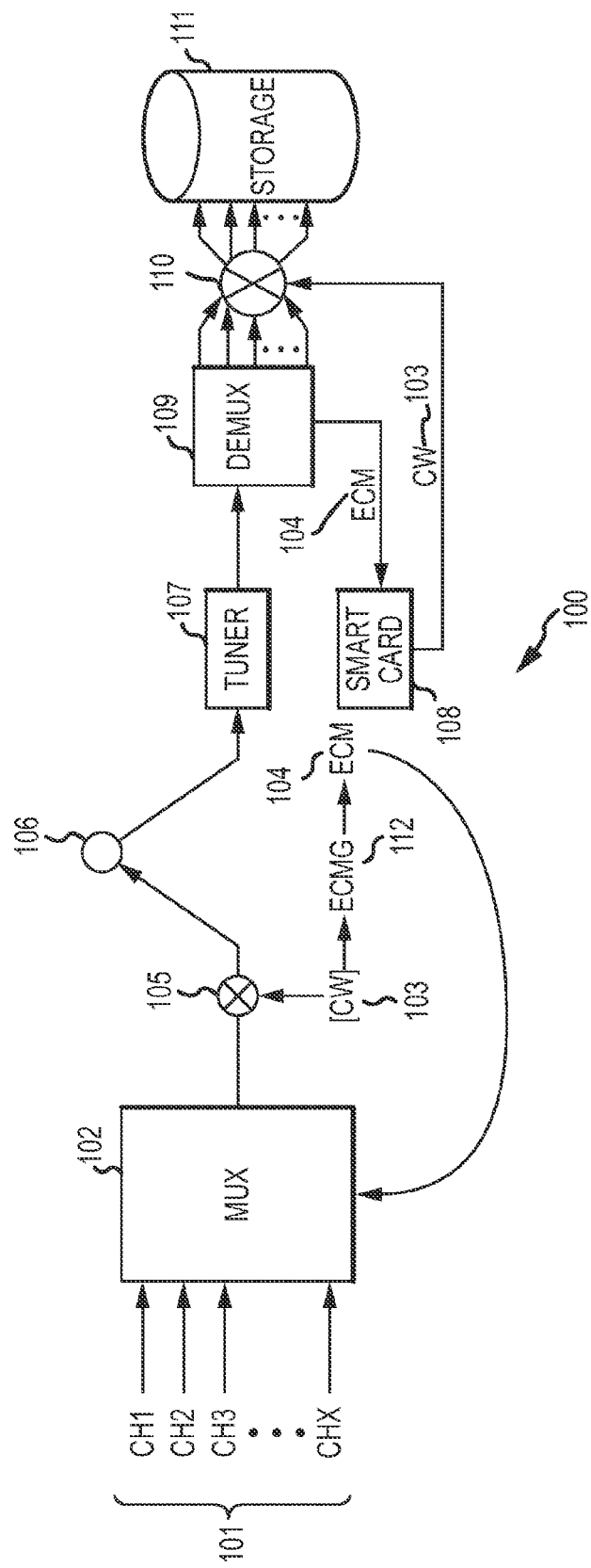
FIG. 1 is a block diagram illustrating a system for automatically recording multiple instances of content from one or more programming providers.

The description that follows includes sample systems, methods, and computer program products that embody various elements of the present disclosure. However, it should be understood that the described disclosure may be practiced in a variety of forms in addition to those described herein.

Content receivers (such as set top boxes, television receivers, digital video recorders, mobile computers, cellular telephones, smart phones, tablet computers, desktop computers, and so on) may receive content from one or more programming providers (such as satellite television programming providers, cable television programming providers, Internet service providers, video on demand providers, pay-per-view movie providers, digital music providers, and so on) via one of more communication connections (such as satellite communication connections, coaxial cable communication connections, Internet communication connections, radio-frequency connections, and so on). Such content receivers may transmit such received content to one or more presentation devices and/or store the received content for later presentation.

In some cases, content receivers may be configured utilizing one or more recording timers to automatically record content that is broadcast by one or more programming providers. Content receiver may be configured to automatically record broadcasted content by user input directly, in response to instructions received from content providers, and so on. Such configuration may involve a designation of the source from which to obtain the specified content as well as a time to begin recording and a time to stop recording.

However, the content that may be automatically recorded between the time to begin recording and the time to stop recording may not completely correspond to the content that a user may actually desire to access. For example, broadcast television programs may not start exactly at their designated start time, may finish after their designated end time, and/or may be delayed due to previous broadcast programs overrunning their time slots. In some cases, recording timers may be set to include recording buffers at the beginning and/or end of recording (such as starting two minutes before the television program is supposed to start and/or ending three minutes after the television program is supposed to finish broadcasting) in an attempt to ensure that the entire television program is recorded even if the television program does not start and/or end precisely on time. However, such a buffer (though possibly ensuring that the entire television program may be recorded) increases the amount of recorded content that may be presented which is not the television program.

Additionally, broadcast television programs may include one or more commercials and/or one or more objectionable scenes (such as extreme violence, nudity, adult language, and so on). As a result of such commercials, objectionable scenes, altered start and/or end times, delays, and/or recording buffers, a significant portion of the content that is recorded may be content other than the content which users wish to access. As a result, users may have to spend more time fast forwarding, rewinding, and/or performing other operations in order to access the desired content and may become frustrated, particularly when accessed content does not immediately present the desired content and/or when the entire desired content was not recorded at all.

The present disclosure discloses systems and methods for altering presentation of received content based on relative position of closed captioning elements. A content receiver may receive one or more closed captioning elements along with positional information regarding one or more segments (or portions) of an instance of content. The closed captioning element may correspond to a component of the closed captioning data included in the content that can be utilized with the positional information to locate where the segments stop and/or start relative to the component of the closed captioning data. For example, an closed captioning and positional information may specify that the start of a medical drama show included in an instance of content begins exactly five minutes prior to the occurrence of the phrase "spinal meningitis" in the closed captioning data included in the content.

Based at least on the closed captioning element and the positional information, the content receiver may analyze the instance of content and may alter how the instance of content will be presented. Such alteration may involve skipping and/or deleting one or more segments, starting presentation of content at a location other than the beginning of the recorded content, altering recording timers if the closed captioning and position information are received before recordation completes, replacing one or more commercials with alternative commercials, and so on. As a result of the content receiver altering how the content will be presented, the content presented to users when accessed may more closely correspond to the content the users desire to access and the users may be more satisfied with their content accessing experiences.

In some cases, users of content receivers may desire to access different instances of content that are broadcast simultaneously and/or substantially contemporaneously by content providers. For example, many television programming viewers wish to watch different television programs that occupy the same broadcast time slot, such as the different television programs associated with the major television programs that are broadcast between seven PM and ten PM mountain time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble and store each of the instances of content desired by the user.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the programs may include multiple PIDs (packet identifiers), such as a video PID and one or more audio PIDs for a particular instance of content. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel utilizing one or more tuners. The content receiver may process only a subset of the programming channels by keeping the data associated with the particular programming channel and discarding data received via the tuned frequency band and multiplexed signal associated with other programming channels, such as by utilizing a PID filter to keep data identified by PIDs related to the particular programming channel and discard data identified by PIDs not related to that particular programming channel. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers may select multiple instances of content 101 to be automatically recorded such as by utilizing predefined recording parameters. For example, a content provider may select all of the television events defined as "primetime events" associated with all channels defined as "primetime television channels" for a particular period of time defined as "prime time" to be automatically recorded. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM by an ECM generator 112 which may take the CW as an input (and may also include other information such as access criteria) and outputs the ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive the frequency band (uplink frequency band) and then broadcast the multiplexed signal to a number of content receivers on a translated frequency band (downlink frequency band), such as a content receiver that includes a tuner 107.

The tuner 107 may tune to the frequency band that includes the multiple instances of content (which may be performed in response to one or more recording instructions received by the content receiver that includes the tuner from the content provider). The data received via the tuned frequency (which may be filtered by a PID filter, not shown) may be demultiplexed by a demultiplexer 109 and then descrambled by a descrambler 110 utilizing the CW before being stored in a non-transitory storage medium 111 (which may take the form of, but is not limited to, a magnetic storage medium; optical storage medium; magneto-optical storage medium; read only memory; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file.

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the CW prior to multiplexing. In another example, in some implementations, the data received via the tuned frequency may be demultiplexed before being individually descrambled utilizing the CW.

In some implementations of the system of FIG. 1, multiple instances of content may be recorded simultaneously from a single transponder and stored in the non-transitory storage medium 111 of the content receiver as a single file of multiple recorded instances of content. Upon playing of one instance of content from the single file of the multiple recorded instances of content, the content receiver may read the file incrementally so as to play the one instance of content while filtering out the other file contents (e.g., the other instance of content within the file).

Figure 2:
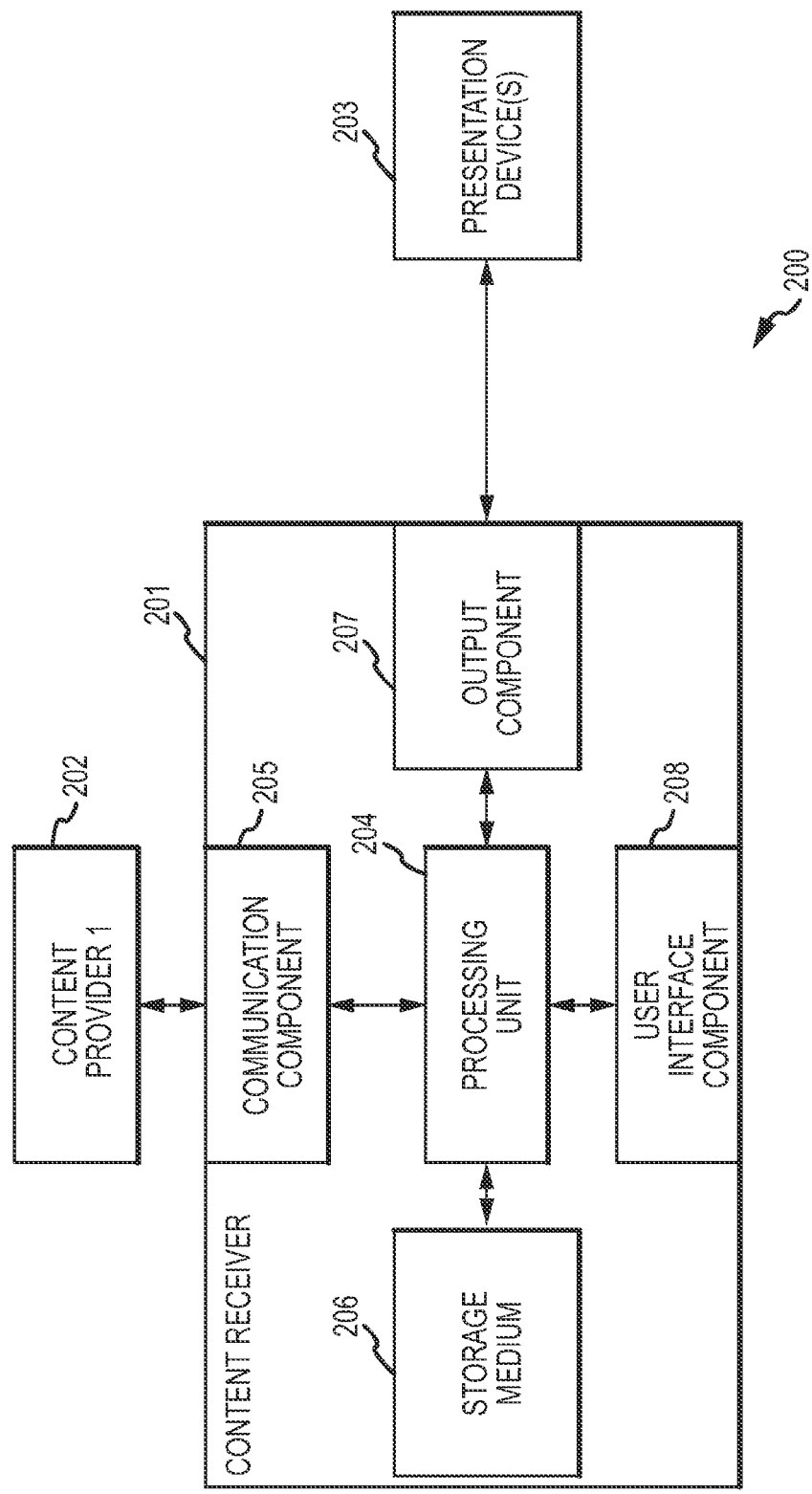
FIG. 2 is a block diagram illustrating a system for altering presentation of received content based on relative position of closed captioning elements. This system may be interrelated with the system of FIG. 1.

FIG. 2 is a block diagram illustrating a system 200 for altering presentation of received content based on relative position of closed captioning elements. The system 200 includes a content receiver 201 that receives content from one or more content providers 202. The content receiver may be any kind of content receiver such as a set top box, a television receiver, a digital video recorder, a mobile computer, a cellular telephone, a smart phone, a tablet computer, a desktop computer, and/or any other kind of electronic device that is capable of receiving content from the content provider. The content provider may be any kind of content provider such as a satellite television programming provider, a cable television programming provider, an Internet service provider, a video on demand provider, a pay-per-view movie provider, a digital music provider, and/or any other kind of entity capable of transmitting content to the content receiver.

The content receiver 201 may include one or more processing units 204, one or more communication components 205, one or more non-transitory storage media 206 (which may take the form of, but is not limited to, a magnetic storage medium; optical storage medium; magneto-optical storage medium; read only memory; random access memory; erasable programmable memory; flash memory; and so on), one or more output components 207, and one or more user interface components 208. The processing unit may execute instructions stored in the non-transitory storage medium to receive content from the content provider 202 via the communication component, store content received from the content provider in the non-transitory storage medium, and/or present content received from the content provider and/or stored in the non-transitory storage medium to one or more presentation devices 203 via the output component. The processing unit may execute such instructions and/or perform various other operations at the direction of instructions received from a user via the user interface component and/or instructions received from the content provider via the communication component.

The processing unit 204 may also receive one or more closed captioning elements corresponding to one or more instances of content from the content provider 202. Along with the closed captioning element, the processing unit may also receive positional information from the content provider regarding one or more segments (or portions) of the instance of content relative to the closed captioning element. In various cases, such closed captioning elements and/or positional information may be received prior to receipt of the instance of content, while the instance of content is being receiver, and/or subsequent to receipt of the instance of content. The positional information may identify the start and/or stop locations of the segments in the instance of content relative to one or more components of closed captioning data included in the instance of content corresponding to the closed captioning element. In some cases, the processing unit may receive one or more redundant copies of the closed captioning element and/or the positional information in case that the first received closed captioning element and/or positional information are corrupt, dropped, and/or are otherwise unusable.

For example, an closed captioning element may correspond to the phrase "I want to order chicken waffles" in closed captioning data included in an instance of content and the positional information may identify that a commercial segment begins in the instance of content five minutes after the occurrence of the phrase "I want to order chicken waffles" and ends ten minutes after the occurrence of the phrase "I want to order chicken waffles." As such, regardless of how the duration of the instance of content may be changed by buffers during recordation, the precise position of the commercial segment can be identified relative to the located phrase "I want to order chicken waffles."

The closed captioning element and/or the positional information may be created by the content provider 202. The content provider may create the closed captioning element and/or the positional information by analyzing a content feed that is subsequently broadcast, substantially simultaneously being broadcast, and/or was previously broadcast. In various implementations, the content feed may be analyzed by content provider staff utilizing video and/or audio editing software to select one or more components of closed captioning data included in the instance of content to correspond to the closed captioning element, determine positional information for one or more segments relative to the selected component of the closed captioning data, create and/or transmit the closed captioning element and/or positional information, and so on. In other implementations, these activities may be performed by automated video and/or audio editing software.

In some implementations, the instance of content may be recorded by the processing unit 204 as part of recording a plurality of instances of content received via at least one broadcast from the content provider 202 as described above with respect to FIG. 1. Further, as discussed above with respect to FIG. 1, the plurality of instances of content may all be included in a same frequency band of the broadcast and may all be encoded utilizing a same control word.

In response to receiving such closed captioning elements and positional information, the content receiver 201 may analyze the instance of content. The closed captioning element may be compared against the closed captioning data included in the instance of content. In analyzing the instance of content, the content receiver may identify the location of the component of the closed captioning data corresponding to the closed captioning element and may additionally identify the locations of the segments relative to the component of the closed captioning data. Based on the analysis, the content receiver 201 may alter how the instance of content will be presented via the output component 207. Exactly how the content receiver alters the instance of content may be based on user input received via the user interface component 208, instructions received from the content provider 202, and/or one or more configuration settings and/or defaults stored in the non-transitory storage medium.

By way of a first example, the content receiver 201 may alter how the instance of content will be presented by configuring the instance of content such that a particular segment is not presented, or skipped, when the instance of content is presented. Such a segment may be a portion of the instance of content preceding the start of an event included in the instance of content, a portion of the instance of content subsequent to the end of an event included in the instance of content, one or more commercials, a portion of the instance of content that includes a content rating (such as a content rating indicating the presence of nudity, graphic violence, adult language, and so on) exceeding a content rating setting of the content receiver, and so on. Thus, although the skipped segment is still present in the instance of content, the skipped segment will not be presented to a user when the instance of content is presented and the user may be unaware that the skipped segment is still present in the instance of content.

In a second example, the content receiver 201 may alter how the instance of content will be presented by removing a particular segment from the instance of content. As such, when the instance of content is presented, the removed segment is not presented because the removed segment is no longer part of the instance of content. Such a segment may be a portion of the instance of content preceding the start of an event included in the instance of content, a portion of the instance of content subsequent to the end of an event included in the instance of content, one or more commercials, a portion of the instance of content that includes a content rating (such as a content rating indicating the presence of nudity, graphic violence, adult language, and so on) exceeding a content rating setting of the content receiver, and so on. Thus, when the content is presented, the content does not include the removed segment and the removed segment is not presented to the user.

In cases where the content receiver 201 alters how the instance of content will be presented by removing one or more segments, the content receiver may replace the one or more removed segments with alternative segments and/or otherwise insert the alternative segments. For example, the content receiver may replace the commercials included in the instance of content with an alternative commercial that is targeted to the user and cannot be fast forwarded or otherwise skipped when the instance of content is presented.

In a third example, the content receiver 201 may receive the closed captioning element and positional information prior to completing recordation of the instance of content. Further, based on the analysis of the instance of content, the closed captioning element, and/or the positional information, the content receiver may determine that an event included in the instance of content will complete after the original recording stop time. For example, a previously broadcast instance of content may have overrun a time slot allocated to the previously broadcast instance of content and the air time for the event may have been pushed back beyond any buffer set for recording the instance of content. Based on this determination, the content receiver may extend the original recording stop time so that the entirety of the event is included in the instance of content despite the delayed air time.

Figure 3:
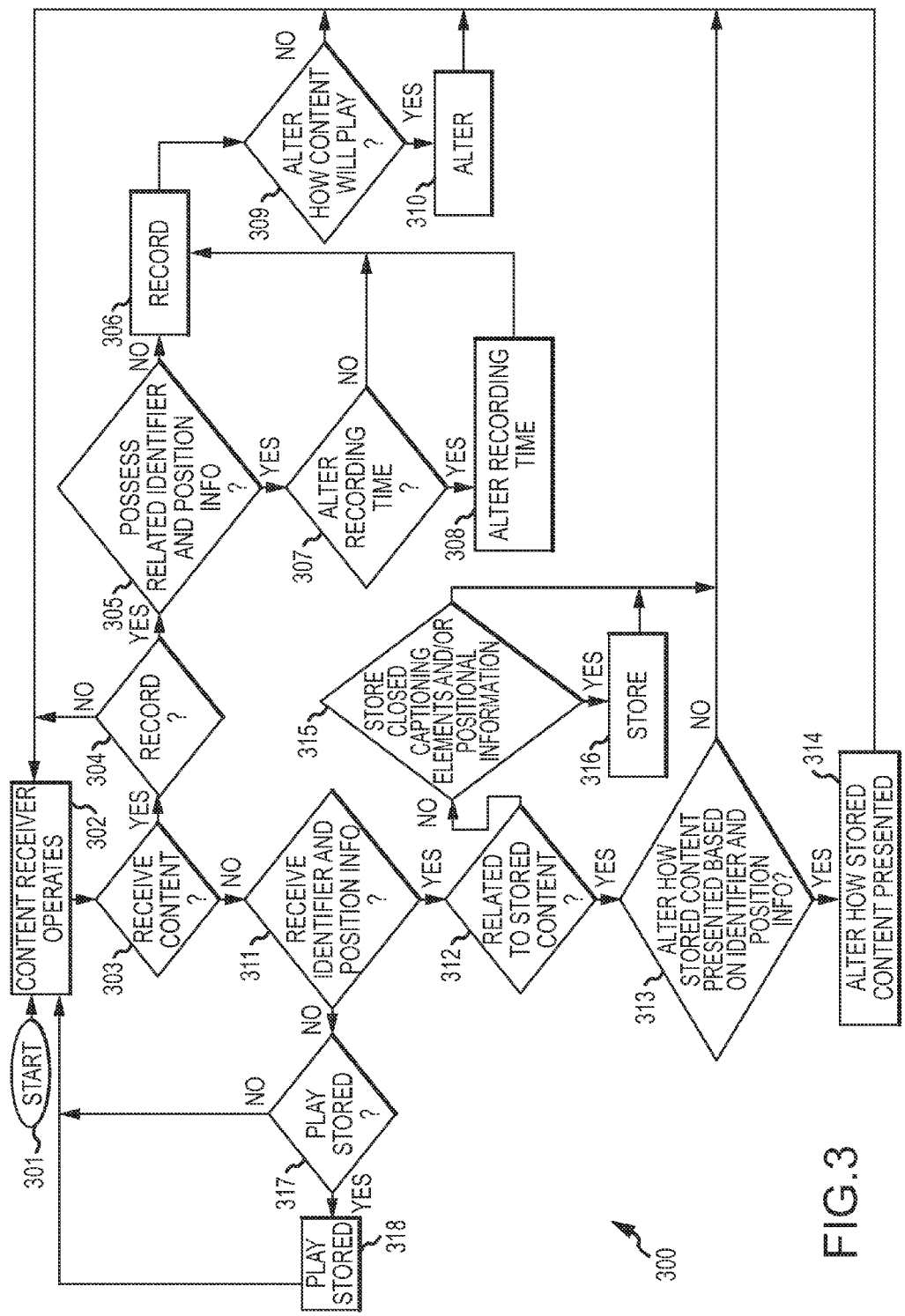
FIG. 3 is a flow chart illustrating a method for altering presentation of received content based on relative position of closed captioning elements. This method may be performed by the system of FIG. 1.

FIG. 3 illustrates a method 300 for altering presentation of received content based on relative position of closed captioning elements. The method 300 may be performed by the content receiver 201 of FIG. 2. The flow begins at block 301 and proceeds to block 302 where the content receiver operates. The flow then proceeds to block 303 where the processing unit 204 determines whether or not content is being received. If so, the flow proceeds to block 304. Otherwise, the flow continues to block 311.

At block 304, after the processing unit 204 determines that content is being received, the processing unit determines whether or not to store the content being received. In some implementations, the processing unit may determine whether or not to store the content being received based on one or more recording timers stored in the non-transitory storage medium 206. If not, the flow returns to block 302 and the content receiver 201 continues to operate. Otherwise, the flow proceeds to block 305.

At block 305, after the processing unit 204 determines to store the content being received, the processing unit determines whether or not closed captioning elements and positional information related to the content being received are stored in the non-transitory storage medium 206. If not, the flow proceeds to block 306 where the processing unit records the content being received in the non-transitory storage medium before the flow proceeds to block 309. Otherwise, the flow proceeds to block 307.

At block 307, after the processing unit 204 determines that closed captioning elements and positional information related to the content being received are stored in the non-transitory storage medium 206, the processing unit determines whether or not analysis of the content being received, the closed captioning elements, and the positional information indicates that a recording time associated with the content being received should be altered. If not, the flow proceeds to block 306 where the processing unit records the content being received in the non-transitory storage medium 206 before the flow proceeds to block 309. Otherwise, the flow proceeds to block 308 where the processing unit alters the recording time accordingly before the flow proceeds to block 306.

At block 309, the processing unit 204 determines whether or not analysis of the content being received, the closed captioning elements, and the positional information indicates that how the recorded content will be presented should be altered. If not, the flow returns to block 302 and the content receiver 201 continues to operate. Otherwise, the flow proceeds to block 310 where the processing unit alters how the recorded content will be presented, such as by altering one or more indexes that may be utilized to present the recorded content. Then, the flow returns to block 302 and the content receiver 201 continues to operate.

At block 311, after the processing unit 204 determines that content is not being received, the processing unit determines whether one or more closed captioning elements and/or positional information has been received. If not, the flow proceeds to block 317. Otherwise, the flow proceeds to block 312.

At block 312, after the processing unit 204 determines that one or more closed captioning elements and/or positional information have been received, the processing unit determines whether or not the received closed captioning elements and/or positional information are related to content stored in the non-transitory storage medium 206. If so, the flow proceeds to block 315. Otherwise, the flow proceeds to block 313.

At block 313, after the processing unit determines that the received closed captioning elements and/or positional information are related to content stored in the non-transitory storage medium 206, the processing unit determines whether or not analysis of the related stored content, the closed captioning elements, and the positional information indicates that how the stored content will be presented should be altered. If not, the flow returns to block 302 and the content receiver 201 continues to operate. Otherwise, the flow proceeds to block 314 where the processing unit alters how the stored content will be presented (such as by altering one or more indexes that may be utilized to present the stored content) before the flow returns to block 302 and the content receiver 201 continues to operate.

At block 315, after the processing unit determines that the received closed captioning elements and/or positional information are not related to content stored in the non-transitory storage medium 206, the processing unit determines whether or not to store the closed captioning elements and/or positional information. If not, the flow returns to block 302 and the content receiver 201 continues to operate. Otherwise, the flow proceeds to block 316 where the processing unit stores the closed captioning elements and/or positional information in the non-transitory storage medium 206 before the flow returns to block 302 and the content receiver 201 continues to operate.

Returning to FIG. 2, in some implementations, the component of the closed captioning data included in the instance of content corresponding to the closed captioning element may be unique within the total closed captioning data included in the instance of content. For example, if the component of the closed captioning data included in the instance of content corresponding to the closed captioning element constitutes the phrase "Frank said he's driving to Tulsa," the phrase may be unique if the phrase only occurs once during the total the closed captioning data included in the instance of content. As such, if the content receiver 201 locates the phrase "Frank said he's driving to Tulsa" anywhere in the closed captioning data included in the instance of content, the content receiver may then utilize the positional information to determine the locations of the segments.

However, in various other implementations, the phrase "Frank said he's driving to Tulsa" may not be unique as it may occur multiple times during the total closed captioning data included in the instance of content. In such cases, the positional information may be selected based on relative temporal position of the segments with respect to the first occurrence of the phrase "Frank said he's driving to Tulsa" in the closed captioning data included in the instance of content. As such, if the content receiver 201 locates the first occurrence of the phrase "Frank said he's driving to Tulsa" in the closed captioning data included in the instance of content, the content receiver may then utilize the positional information to determine the locations of the segments.

In still other implementations where the phrase "Frank said he's driving to Tulsa" may not be unique as it occurs multiple times during the total closed captioning data included in the instance of content, the closed captioning element may correspond to the first component of the closed captioning data and an additional component of the closed captioning data that is located within temporal proximity to the phrase "Frank said he's driving to Tulsa." Although the phrase "Frank said he's driving to Tulsa" may occur multiple times, there may be only one occurrence of the phrase "Frank said he's driving to Tulsa" that is temporally located exactly thirty second after the occurrence of the phrase "Bob asked what Frank plans to do about losing the farm" in the closed captioning data included in the instance of content. As such, if the content receiver 201 locates the occurrence of the phrase "Frank said he's driving to Tulsa" that occurs exactly thirty seconds after the occurrence of the phrase "Bob asked what Frank plans to do about losing the farm" in the closed captioning data included in the instance of content, the content receiver may then utilize the positional information to determine the locations of the segments.

FIGS. 4A-4D illustrate alteration of presentation of received content 401a-401d by a system based on relative position of closed captioning elements. The system may be the system of FIG. 2. FIG. 4A is a conceptual diagram of an instance of received content 401a. As shown, the instance of received content includes part I of a show 403, part II of the show 405, and part III of the show 407. As also shown, in addition to the parts of the show, the instance of received content also includes a portion of a previous show 402, a commercial block A 404, a commercial block B 406, and a portion of a next show 408. As further illustrated, the instance of received content further includes a component 409 of closed captioning data included in the received content that corresponds to a closed captioning element.

A content receiver that has received the instance of content 401a may also receive the closed captioning element as well as positional information that specifies the start and stop of each of the segments included in the instance of content. The content receiver may then analyze the closed captioning data included in the instance of content based on the closed captioning element and the positional information and may thereupon alter how the instance of content will be presented.

In some cases, the content receiver may configure the instance of content 401a such that one or more of the segments are skipped when the instance of content is presented. For example, the content receiver may configure the instance of content such that playing the instance of content starts at 2:00 and finishes at 32:00. Thus, the portion of the previous show 402 and the portion of the next show 408 would not be presented when the instance of content is played even though both are still present. By way of another example, the content receiver may configure the instance of content such that playing the instance of content starts at 2:00, jumps from 10:00 to 13:00, jumps from 20:00 to 25:00, and finishes at 32:00. Thus, the portion of the previous show 402, the commercial block A 404, the commercial block B 406, and the portion of the next show 408 would not be presented when the instance of content is played even though all are still present.

In other cases, the content receiver may remove one or more segments from the instance of content 401a such that removed segments are not included in the instance of content and are hence not played when the instance of content is presented. For example, as illustrated by FIG. 4B, the content receiver may remove the portion of the previous show 402 and the portion of the next show 408 from the instance of content 401b. As the portion of the previous show 402 and the portion of the next show 408 are no longer a component of the instance of content 401b, the portion of the previous show 402 and the portion of the next show 408 will not be played when the instance of content 401b is presented.

By way of a second example, as illustrated by FIG. 4C, the content receiver may remove the portion of the previous show 402, the commercial block A 404, the commercial block B 406, and the portion of the next show 408 from the instance of content 401c. As the portion of the previous show 402, the commercial block A 404, the commercial block B 406, and the portion of the next show 408 are no longer a component of the instance of content 401c, none of these segments will be played when the instance of content 401c is presented.

In still other cases, as illustrated by FIG. 4D, the content receiver may insert one or more alternative segments into the instance of content 401d as well as remove one or more segments from the instance of content 401d such that removed segments are not included in the instance of content and are hence not played when the instance of content is presented. As illustrated, the portion of the previous show 402, the commercial block A 404, the commercial block B 406, and the portion of the next show 408 are no longer a component of the instance of content 401d and will not be played when the instance of content 401d is presented. Further, as illustrated, a commercial 410 targeted to the user of the set top box has been inserted into the instance of content 401d and will be played prior to part I of the show 403 when the instance of content 401d is played.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for altering presentation of received content based on relative position of closed captioning elements, the method comprising:
   recording, utilizing at least one processing unit, at least one instance of content as part of recording a plurality of instances of content received via at least one broadcast from at least one content provider wherein the plurality of instances of content are all included in a same frequency band of the at least one broadcast and are all encoded utilizing a same control word;
   receiving, utilizing the at least one processing unit, at least one closed captioning element corresponding to the at least one instance of content and positional information regarding at least one segment of the at least one instance of content relative to the at least one closed captioning element;
   analyzing, utilizing the at least one processing unit, the at least one instance of content based at least on the at least one closed captioning element and the positional information; and
   altering, utilizing the at least one processing unit, how the at least one instance of content will be presented by the at least one processing unit based at least on the analysis of the at least the at least one closed captioning element and the positional information.

2. The method of claim 1, wherein said operation of altering, utilizing the at least one processing unit, how the at least one instance of content will be presented by the at least one processing unit further comprises performing at least one of configuring the at least one instance of content to skip the at least one segment when the at least one instance of content is presented or removing the at least one segment from the at least one instance of content.

3. The method of claim 2, wherein the at least one segment comprises at least one of at least one portion before an event included in the at least one instance of content, at least one portion after an event included in the at least one instance of content, at least one commercial, or at least one portion of an event included in the at least one instance of content designated with a content rating above a threshold.

4. The method of claim 3, wherein said operation of performing at least one of configuring the at least one instance of content to skip the at least one segment when the at least one instance of content is presented or removing the at least one segment from the at least one instance of content comprises removing the at least one segment and wherein the method further comprises replacing the at least one segment with at least one alternate segment.

5. The method of claim 4, wherein the at least one alternate segment comprises at least one commercial.

6. The method of claim 1, wherein said operation of altering, utilizing the at least one processing unit, how the at least one instance of content will be presented by the at least one processing unit further comprises:
    determining based at least on based at least on the analysis of the at least one instance of content that at least one event included in the at least one instance of content extends beyond an original recording end time associated with the recording of the at least one instance of content; and
    extending the recording of the at least one instance of content beyond the original recording end time.

7. The method of claim 1, wherein said operation of analyzing, utilizing the at least one processing unit, the at least one instance of content based at least on the at least one closed captioning element and the positional information further comprises locating the at least one closed captioning element in closed captioning data included in the at least one instance of content.

8. The method of claim 1, wherein the at least one closed captioning element corresponds to at least one of a unique component of closed captioning data included in the at least one instance of content or a first temporal instance of a component of the closed captioning data included in the at least one instance of content.

9. The method of claim 1, wherein the at least one closed captioning element comprises at least a first closed captioning element and a second closed captioning element wherein the first closed captioning element corresponds to a first component of closed captioning data included in the at least one instance of content and the second closed captioning element corresponds to a second component of the closed captioning data included in the at least one instance of content that is within a particular temporal proximity of the first component.

10. A system for altering presentation of received content based on relative position of closed captioning elements, comprising:
    at least one communication component that receives at least one closed captioning element corresponding to at least one instance of content and positional information regarding at least one segment of the at least one instance of content relative to the at least one closed captioning element;
    at least one output component that is operable to present the at least one instance of content; and
    at least one processing unit that analyzes the at least one instance of content based at least one the at least one closed captioning element and the positional information;
    wherein the at least one instance of content is recorded by the at least one processing unit to at least one non-transitory storage medium as part of recording a plurality of instances of content received utilizing the at least one communication component via at least one broadcast from at least one content provider wherein the plurality of instances of content are all included in a same frequency band of the broadcast and are all encoded utilizing a same control word and wherein the at least one processing unit alters how the at least one instance of content will be presented by the at least one output component based at least on the analysis of the at least one closed captioning element and the positional information.

11. The system of claim 10, wherein the at least one closed captioning element comprises at least a first closed captioning element and a second closed captioning element, the first closed captioning element corresponds to a first component of closed captioning data included in the at least one instance of content, the second closed captioning element corresponds to a second component of the closed captioning data included in the at least one instance of content, and the second component is within a particular temporal proximity of the first component in the closed captioning data included in the at least one instance of content.

12. The system of claim 10, wherein the at least one closed captioning element corresponds to at least one of a unique component of closed captioning data included in the at least one instance of content or a first temporal instance of a component of the closed captioning data included in the at least one instance of content.

13. The system of claim 10, wherein the at least one processing unit analyzes the at least one instance of content by locating the at least one closed captioning element in closed captioning data included in the at least one instance of content.

14. The system of claim 10, wherein the at least one processing unit alters how the at least one instance of content will be presented by the at least one communication component by performing at least one of configuring the at least one instance of content to skip the at least one segment when the at least one instance of content is presented or removing the at least one segment from the at least one instance of content.

15. The system of claim 14, wherein the at least one segment comprises at least one of at least one portion before an event included in the at least one instance of content, at least one portion after an event included in the at least one instance of content, at least one commercial, or at least one portion of an event included in the at least one instance of content designated with a content rating above a threshold.

16. The system of claim 14, wherein the at least one processing unit alters how the at least one instance of content will be presented by the at least one communication component by removing the at least one segment from the at least one instance of content and replacing the at least one segment with at least one alternate segment.

17. The system of claim 16, wherein the at least one alternate segment comprises at least one commercial.

18. The system of claim 10, wherein the at least one processing unit records the at least one instance of content in at least one non-transitory storage medium and wherein the at least one processing unit alters how the at least one instance of content will be presented by the at least one output component by determining based at least on the analysis of the at least one instance of content that at least one event included in the at least one instance of content extends beyond an original recording end time and extending the recording of the at least one instance of content beyond the original recording end time.

19. A computer program product, comprising:
- a first set of instructions, stored in at least one non-transitory machine readable medium, executable by at least one processing unit to record at least one instance of content as part of recording a plurality of instances of content received via at least one broadcast from at least one content provider wherein the plurality of instances of content are all included in a same frequency band of the at least one broadcast and are all encoded utilizing a same control word;
- a second set of instructions, stored in the at least one non-transitory machine readable medium, executable by the at least one processing unit to receive at least one closed captioning element corresponding to the at least one instance of content and positional information regarding at least one segment of the at least one instance of content relative to the at least one closed captioning element;
- a third set of instructions, stored in the at least one non-transitory machine readable medium, executable by the at least one processing unit to analyze the at least one instance of content based at least on the at least one closed captioning element and the positional information; and
- a fourth set of instructions, stored in the at least one non-transitory machine readable medium, executable by the at least one processing unit to alter how the at least one instance of content will be presented based at least on the analysis of the at least the at least one closed captioning element and the positional information.

20. The computer program product of claim 19, wherein altering how the at least one instance of content will be presented further comprises at least one of configuring the at least one instance of content to skip the at least one segment when the at least one instance of content is presented or removing the at least one segment from the at least one instance of content.

* * * * *